July 8, 1952 — R. J. GORECKI — 2,602,188
TRANSMISSION BELT MOLD
Filed March 5, 1949 — 2 SHEETS—SHEET 2
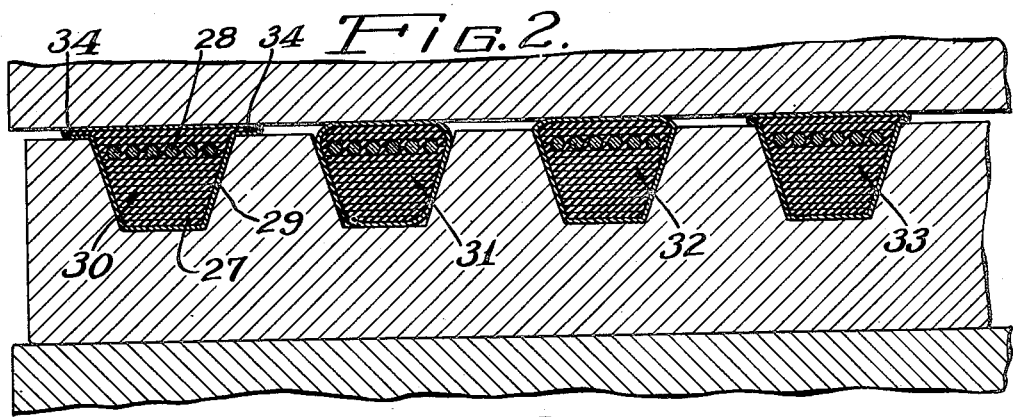
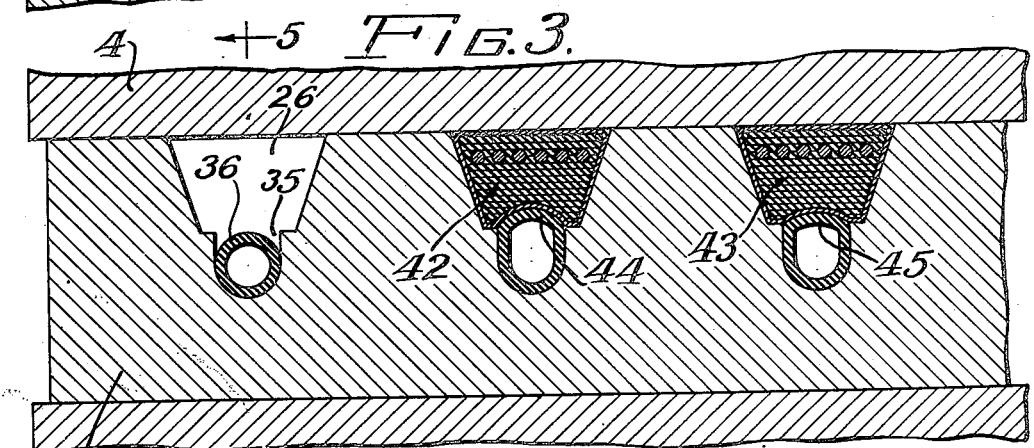
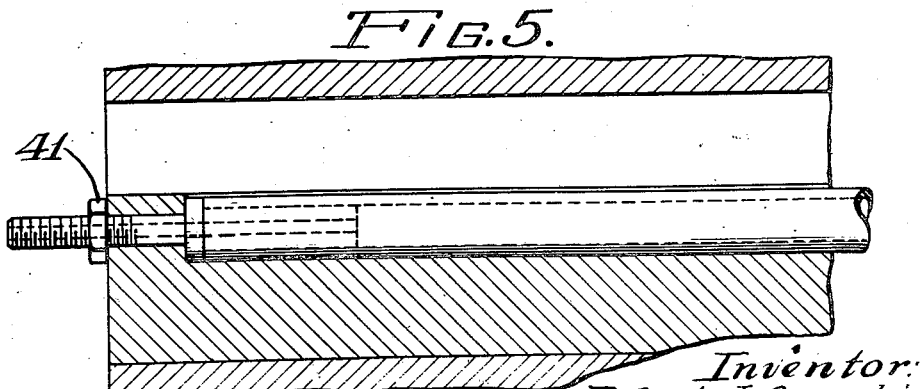
Inventor:
Robert J. Gorecki
By Lee J. Gary
Attorney Patented July 8, 1952

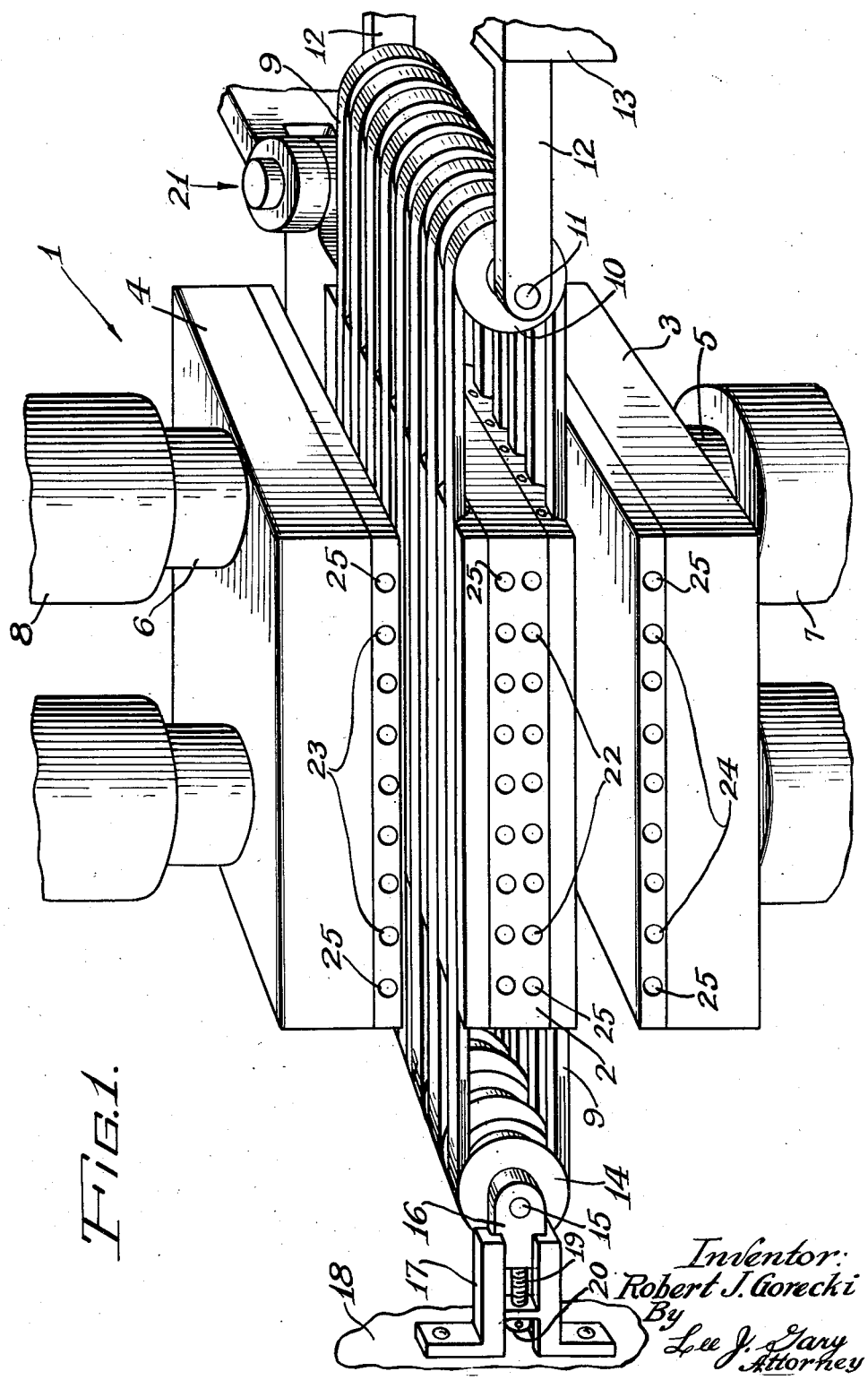

2,602,188

UNITED STATES PATENT OFFICE 2,602,188

TRANSMISSION BELT MOLD

Robert J. Gorecki, Passaic, N. J., assignor to Raybestos-Manhattan, Inc., Passaic, N. J., a corporation of New Jersey Application March 5, 1949, Serial No. 79,741

7 Claims. (Cl. 18—17)

This invention relates to improvements in apparatus for forming transmission belts of the V or trapezoidal-sectioned type, and refers particularly to apparatus for molding and curing said belts in sections.

In my copending patent applications Serial Nos. 732,437 and 782,397 filed on March 5, 1947, and October 27, 1947, respectively, of which the former has matured into Patent No. 2,518,137 apparatus is shown and described for molding endless belts of the V or trapezoidal type in a single operation, the belt being molded and cured in one piece. The apparatus described in said patent applications is ideally adaptable for belts of relatively short length such as those commonly used for fan belts on internal combustion engines.

In forming, or molding and curing similar belts of greater length, it is uneconomical and difficult to mold and cure the entire belt in a single operation because of the size of the molding apparatus necessary to accommodate such longer belts and the difficulties involved in handling the belts and apparatus.

Consequently, in the manufacture of relatively long endless belts of the type in question, it has heretofore been the practice to mold and cure sections or predetermined lengths of the belts separately, the complete belt being molded and cured in two or more operations depending upon the length of the belts.

The apparatus for performing the molding and curing operation has heretofore been such that sections of a plurality of belts are operated upon simultaneously. However, such apparatus has not been completely satisfactory in that it has been substantially impossible to reproduce, as a commercial operation, belts of uniform length, uniform density, uniform strength and belts having uniform operating characteristics.

In building up the belt carcass prior to molding and curing, predetermined tolerances are employed which if made more critical would render the belts prohibitive in price. Within these commercial tolerances belts of unequal length are frequently produced from carcasses of the same specifications. In addition, predetermined portions of belts also vary as to the tension of their strength members and as to their density to say nothing of variations in other factors which affect the life of the belt. In other words, belts made carcasses of the same specifications, not only differ from each other, but sections of a predetermined belt may differ from other sections of the same belt.

A common use for such belts is upon multiple belt drives where a plurality of belts supposed to be similar are employed. To secure belts for a predetermined drive they must be selectively matched as to length in that it is commercially impractical to reproduce identical belts except through the caprices of chance. Even though so-called matched belts are employed only operation will reveal whether the belts have similar operating characteristics since latent differences in the belts exist.

In the present invention I provide a molding and curing apparatus which obviates many of the difficulties hereinbefore discussed. Belts may be made from carcasses of predetermined commercial specifications which have uniform lengths and predetermined belts will be of substantially uniform density and have strength members of uniform tension. In addition, trimming of the belts after molding and cure is unnecessary which eliminates areas of potentially premature wear.

Briefly described the present invention contemplates a mold in which sections of a plurality of belts may be simultaneously molded and cured, resilient means being provided in conjunction with each mold cavity so as to bear upon the carcass in the cavity with controllable uniform pressure after the mold is closed.

Other objects and advantages of my invention will be apparent from the accompanying drawings and following detailed description.

In the drawings:

Fig. 1 is a diagrammatic perspective view of a belt mold employing an embodiment of my invention.

Fig. 2 is a detailed sectional view, illustrating particularly the the upper portion of the central mold member of a conventional belt mold.

Fig. 3 is a view similar to Fig. 2 of the central mold member of the device illustrated in Fig. 1.

Fig. 4 is a fragmentary detailed view, parts being broken away and parts being shown in section, of the fitting for one of the resilient tubes employed in my invention.

Fig. 5 is a detailed sectional view through a portion of the central platen of my mold illustrating the manner of mounting a resilient tube therein.

Referring in detail to the drawings, 1 indicates diagrammatically a mold which is particularly adaptable for the molding and curing of sections of a plurality of relatively long endless belts. The mold 1 comprises essentially a central stationary platen 2, a lower movable platen 3 and an upper movable platen 4. The lower and upper platens 3 and 4 may be moved vertically toward and away from the central stationary platen 2 by means of hydraulic pistons 5 and 6 respectively which operate in hydraulic cylinders 7 and 8 respectively. Of course, means (not shown) are provided for supplying hydraulic fluid to the cylinders 7 and 8 to properly manipulate and control the movement of the platens 3 and 4.

A mold of the type designated by the numeral 1 may be employed to mold and cure sections of a plurality of V or trapezoidal section belts 9. In employing the mold 1 the belts 9 are carried at one end around a plurality of sheaves 10 which are in turn carried upon a shaft 11. The shaft 11 is supported by brackets 12 which in turn are mounted upon a stationary support 13. Of course, means (not shown) is provided for removing the sheaves 10 from the shaft 11 in order to mount and remove the belts 9 from the sheaves. The arrangement comprising the sheaves 10, shaft 11 and brackets 12 is stationary with regard to lateral movement of the shaft 11.

At the opposite end of the mold 1 the belts 9 are trained around a plurality of sheaves 14 which in turn are carried upon a shaft 15. Shaft 15 is journaled in a pair of blocks 16, only one of which is shown, the blocks being movable to move the shaft 15 toward or away from the shaft 11 so as to control the tension of the belts 9 for a purpose which will be hereinafter more fully described. The blocks 16 may be carried upon brackets 17 which in turn are mounted upon a stationary support 18. A screw 19 may be engageable with each of the blocks 16 and may be manipulated by the capstan head 20 to move the blocks 16 inwardly or outwardly with respect to the brackets 17 in order to properly tension the belts 9.

The mold 1 diagrammatically illustrates in general a commonly employed mold referred to as the "goose neck" type, that is, one side of the mold, the proximate side shown in the drawing, being open in the sense that it is devoid of posts, guides or other supporting apparatus. In this type of mold the central mold member 2 may be supported at the rear of the mold. For instance, the central mold member 2 may be carried upon a bracket assembly 21 which holds the central mold member 2 stationary and in a position with its upper and lower surfaces substantially parallel to the upper and lower passes of the belts 9.

The central mold member 2 is provided with a plurality of apertures 22 through which a heating fluid is adapted to pass, said fluid being adapted to heat the central mold member to the proper curing temperature necessary to cure the belts 9. The upper and lower movable mold members 4 and 3 are also provided with a plurality of apertures 23 and 24 respectively through which a heating fluid may be passed to heat said respective movable mold members. As will be hereinafter more fully described the opposite ends of the movable and stationary mold members are adapted to be chilled during the molding operations and to accomplish this end endmost apertures 25 are provided in all of the mold members through which a cooling fluid may be passed.

In the upper and lower faces of the central mold member 2 a plurality of mold cavities 26 are provided, said cavities being of a cross sectional shape such as to mold the belts 9 in proper form. The mold cavities 26 are elongated and are disposed in parallel relationship so as to accommodate sections of each of the belts carried upon the sheaves 10 and 14. For purposes of illustration, the mold cavities 26 are shown as being substantially trapezoidal in cross section with the base of the trapezoids opening toward the faces of the central mold member 2. After the belts 9 have been mounted upon the sheaves 10 and 14 and the screws 19 manipulated in order to impart the desired degree of tension to the belts it will be seen that the central portions of the straight sections of said belts will be deposited or positioned in the cavities 26. The upper face of the lower movable mold member 3 and the lower face of the upper movable member 4 are substantially flat and in the operation of the mold said flat faces are adapted to bear upon the belt sections which are positioned in the recesses 26 provided in the upper and lower faces of the central mold member 2.

The mold 1 as described hereinbefore is substantially of conventional construction and in order to illustrate the advantages of my invention the normal operation of said mold will be described.

The conventional V or trapezoidal section transmission belt is made up normally from a plurality of rubberized plies 27 of fabric. In some forms of belt construction the lowermost plies are eliminated and the lowermost or innermost portion of the belt comprises rubber per se. Adjacent the upper surface of the belt, that is the outer surface of the belt when it is in use, and embedded in the thickness of the belt are a plurality of strength members 28 which are normally relatively strong cords. These strength members are sometimes referred to as tension members and their function in the belt construction is to impart longitudinal strength to the belt. After the assembly and proper cutting of the plies 27 the entire belt structure is normally wrapped with a shroud of fabric 29. The belt in this form and at this state of operation is referred to as the carcass. These belt carcasses are the ones which are operated upon by the mold 1, the mold functioning to properly form the carcass so far as its section is concerned and also to cure the rubber while the carcass is being held in properly formed condition.

In the manufacture of the belt carcass the various components of the carcass are formed to approximate shape within certain degrees of tolerance. If these tolerances are made too close the manufacture of the belt becomes prohibitive from an economic viewpoint. Consequently, the normal uncured carcass may have variations in its sectional area or speaking in terms of the entire belt, the volume of one belt made from a predetermined carcass specification may be different from the volume of another belt carcass made from the same specification. In addition, it is frequently found that sectional areas of the same belt made from a predetermined specification may vary.

Referring particularly to Fig. 2 the effect of these variations is illustrated wherein the belt carcasses are molded and cured in the conventional type of mold. In Fig. 2 several carcasses are illustrated as being positioned in the recesses of the upper face of the conventional central mold section. The upper mold member is shown in its closed position.

The carcass designated as 30 is one whose sectional area is greater than normal. The carcass designated by the numeral 31 is one whose sectional area is slightly less than normal or desired. The carcass designated by the reference numeral 32 is one which is approximately correct and the carcass designated by the reference numeral 33 is one which is slightly greater in sectional area than desired. The carcasses 27 to 33 are representative of the normal carcasses made under commercial tolerances. It will be noted that the carcass 30 has an excess of volume and that when pressure is applied by the upper mold member a portion of the stock of the carcass is squeezed laterally from the recess as indicated at 34 in Fig. 2. It will be noted that simultaneously the carcass 31 will only be slightly compressed, the carcass 32 will be compressed to a greater degree and the carcass 33 will be compressed to a degree greater than the carcass 32. As an example, if it is desired to apply say two hundred pounds per square inch pressure upon the carcasses during the molding operation it will be appreciated that the carcass 30 may receive, for example, 350 pounds per square inch pressure. At the same time the carcass 31 may only receive about 30 pounds per square inch pressure and the carcass 32 may receive about 50 pounds. Obviously the carcass 33 will receive a different pressure, possibly above or below the desired pressure. Obviously, with a situation such as this the belt carcasses 30 to 33 will all be "pressured" to a different extent and as a result the density of the various belts will be different. In addition, it will be noted that carcasses 30 and 33 will require treatment to eliminate the squeezed out portion of the carcass. Obviously, this treatment will cut the shroud 29 which very seriously weakens the belt particularly with regard to its abrasive resistance.

In addition to the above difficulties a most serious difficulty is presented in that the carcass 30, being subjected to the greatest degree of pressure, will tend to have its components squeezed longitudinally, that is, there will be a longitudinal flow of the materials. This is known in the art as "push-out." One of the serious results of push-out is that the strength tension members 28 will be stretched and as a consequence a belt made from the carcass 30 will normally in its finished condition be longer than the normal belt made from the carcass 32 and will be materially longer than the belt made from the carcass 31. It can readily be seen that although all of the carcasses may be made to commercial tolerance specifications the resulting belts may in regard to density and strength be materially different. For instance, a belt which has a pitch length of about three hundred inches may have its length varied by as high as three inches or more due to push-out.

Another one of the difficulties encountered from push-out is that the sectional area or the volume of a predetermined belt carcass may not be uniform throughout the entire length of the belt. In this case it will be seen that the belt may be elongated in certain sections to a greater degree than it is elongated in other sections. This results in the strength members 28 being molded and confined at a predetermined degree of tension in one section of the belt and the continuations of said strength members may be maintained at a different tension at other sections of the same belt. This results in an improperly operating belt which has short life and is conducive to "whip" and vibration.

As a feature of my present invention I provide a recess 35 at the base of each of the cavities 26 in the central mold member 2, the recess 35 being relatively elongated and being slightly shorter in length than the respective cavity to which it is joined. In each recess 35 a flexible hollow tube 36 is adapted to be positioned, said tube normally being totally contained within the recess 35.

Referring particularly to Figs. 4 and 5 each tube 36 is joined at its end to a fitting 37. The fitting 37 has a central bore 38 and is restricted in diameter at one end for insertion into the interior of tube 36 as indicated best at 39 in Fig. 4. The outer surface of the portion 39 may be threaded or otherwise roughened and is preferably cemented within the tube 36. The opposite end 40 of the fitting 37 is provided with threads whereby said fitting may be engaged by nut 41 to retain the fitting and tube in its proper position within the recess 35. Each of the fittings 40 at the opposite ends of each of the tubes 36 is connected to a suitable source of fluid under pressure. The pressure fluid may comprise compressed air, steam or may comprise a hydraulic liquid.

When employing my invention the carcasses indicated by the numeral 9 carried upon the sheaves 10 and 14 are positioned in the respective recesses 26. As has been hereinbefore described, some of said carcasses may be of greater or lesser sectional area than other carcasses. In Fig. 3 two such carcasses are illustrated. The carcass 42 may be one which has a relatively small sectional area whereas the carcass 43 may be one which has a relatively large sectional area.

In operation no pressure fluid is initially introduced into the tubes 36. The carcasses may then be disposed in the cavities 26 and the upper and lower mold members 4 and 3 may be brought to closed position with respect to the central mold member 2. Upon the closing of the movable mold members any excess volume of any of the carcasses will be relieved by depressing the walls of the tubes 36 exposed to the cavities. This permits the complete closing or seating of the movable mold members with respect to the central stationary mold member. After the mold members are closed fluid under pressure is introduced into all of the tubes 36. Depending upon the various volumes of the carcasses the tubes 36 will be inflated to a greater or lesser degree as indicated at 44 and 45 in Fig. 3. It will be noted that inasmuch as the movable mold members are properly fitted upon the stationary mold member and the cavities 26 are completely enclosed laterally, there is no tendency for the stock comprising the carcasses to be squeezed outwardly as is the case illustrated in Fig. 2 at 34. Consequently, there will be no need for subsequent trimming of the belts. In view of the fact that the effective pressure exerted upon all of the carcasses is essentially fluid pressure and is derived from the same source the effective pressure upon each of the carcass sections of the various belts will be the same. In addition, the pressure upon a predetermined carcass will be uniform throughout the length of the section contained in the respective cavity 26.

As can readily be appreciated all of the belts will be densified to a uniform degree and that each individual belt section will be densified uniformly throughout the length of said section and this regardless of the initial volume of the belt carcass. Hence, densification or pressure will not be a function of the volume of the belt carcass in the cavity. In view of the fact that all of the belt carcasses in the recesses 26 will be subjected to substantially the same densifying pressure the degress of longitudinal movement of the belt carcass components which occurs, that is, the degree of push-out, will be the same for all of the carcasses in all of the cavities. Hence, the strength members of the various belts will be stretched or tensioned to the same extent and the various sections of the belts in the cavities will be lengthened to the same extent.

After the various sections of the belts in the mold cavities have been subjected to heat and pressure for a sufficient length of time to properly cure the same the pressure in the tubes 36 may be relieved, or, if desired, the various tubes 36 may be connected to a source of negative pressure or vacuum so as to collapse the tubes. The movable mold members 3 and 4 are then moved away from the central stationary mold member 2 and the sheaves 10 and 14 are rotated to remove the cured sections of the belts from the cavities 26 and position uncured sections of the belts in said cavities so that they may be cured. The operation hereinbefore described is then repeated.

It can readily be seen that inasmuch as all sections of all of the belts as well as each section of each belt is subjected to the same degree of densifying pressure, the density of all of the belts and the density of each belt throughout its entire length will be substantially uniform. In addition because of the uniform densifying pressure all belts will be stretched to the same extent and the strength members of all of the belts will be under a uniform tension. This, of course, is also true with regard to each individual belt; that is, its strength members throughout the entire length of the belt will be under uniform tension.

As has been hereinbefore described during the molding and curing operation a cooling fluid is passed through the apertures 25 of the various mold members. The purpose of this operation is to limit curing of the various belt sections to those portions of the belt sections which are within the mold cavities and which are subjected to pressure. It has been found that if the endmost portions of the sections in the mold are not chilled, curing of the belt carcasses will occur adjacent the endmost portions of the sections in the cavities and said curing will occur at those portions of the belt which are adjacent to the mold but not confined within the cavities. This of course is an undesirable condition and is suppressed by the passage of the cooling fluid through the openings 25.

I claim as my invention:

1. A device for simultaneously molding and curing a plurality of sections of endless transmission belts of the rubber type which comprises in combination, means for maintaining said sections of the belt carcasses in tension to straighten said sections of the belt carcasses in spaced parallel relationship to each other, a pair of mold members, one of said members being provided with a plurality of elongated straight cavities disposed in spaced parallel relationship to each other to receive said sections of the belts, the other mold section comprising a closure for the length of said cavities to confine said sections of the belts in the mold cavities, means positioned at the opposite face of said cavities from said closure for applying uniform resilient dynamic pressure along the length of all of said sections simultaneously while said belt sections are confined in the mold cavities, and means for heating said mold members to cure said belt sections.

2. A device for simultaneously molding and curing a plurality of sections of transmission belts of the rubber type which comprises in combination, means for maintaining said sections of the belt carcasses in tension to straighten the same, a pair of mold members, said members providing a plurality of parallel disposed, open-ended, elongated straight mold cavities adapted for the reception of said straight sections of the belt carcasses, one mold member defining one wall of each of said cavities being provided with recesses opening into said cavities, means in said recesses for simultaneously applying transverse uniform resilient pressure upon the belt carcass sections in said cavities comprising a plurality of resilient members in said recesses, each being outside its respective adjacent cavity, and means for expanding said resilient members transversely toward said cavity into contact with the carcass positioned in said cavity, said mold members and said resilient members cooperating together to define mold cavities which are substantially completely enclosed laterally, and means for heating said mold members.

3. A device for simultaneously molding and curing a plurality of sections of transmission belts of the rubber type which comprises in combination, means for maintaining said sections of the belt carcasses in tension to straighten the same in parallel spaced relationship, a pair of mold members, said members providing a plurality of elongated straight open-ended mold cavities adapted for the reception of said straight sections of the belt carcasses, one mold member defining one wall of each of said cavities being provided with a plurality of recesses each being shorter in length than said cavities and each recess opening into a respectively adjacent cavity, means in said recesses for applying transverse resilient pressure upon the belt carcass sections in said cavities along their length comprising an elongated inflatable member in each of said recesses, and means for inflating said members, each inflatable member being normally outside its respectively adjacent cavity and each being expansible transversely toward its respective cavity when inflated into contact with the carcass therein, said mold members and said inflatable members cooperating together to define mold cavities which are substantially completely enclosed laterally, and means for heating said mold members.

4. A device for simultaneously molding and curing a plurality of sections of transmission belts of the rubber type which comprises in combination, means for maintaining said sections of the belt carcasses in tension to straighten the same and dispose them in spaced parallel relationship, a pair of mold members, said members providing a plurality of elongated straight spaced parallel mold cavities adapted for the reception of said straight sections of the belt carcasses, one mold member defining one wall of each of said cavities being provided with a plurality of recesses shorter in length than said cavities and each recess opening into a respectively adjacent cavity, means in each recess for applying transverse dynamic pressure upon the belt carcass section in the respectively adjacent cavity along its length said dynamic pressure means being normally outside the respectively adjacent cavity and having a portion movable transversely toward said cavity into contact with the carcass carried therein to establish uniform resilient pressure along substantially the entire length of each section, said mold members and said dynamic pressure members cooperating together to define a plurality of mold cavities which are substantially completely enclosed laterally, and means for heating said mold cavities.

5. A device for simultaneously molding and curing a plurality of sections of transmission belts of the rubber type which comprises in combination, means for maintaining said sections of the belt carcasses in tension to straighten the same and dispose the same in spaced parallel relationship, a pair of mold members, said members providing a plurality of spaced parallel elongated straight open-ended mold cavities adapted for the reception of said straight sections of the belt carcasses, one mold member defining one wall of each of said cavities being provided with a plurality of recesses substantially coextensive in length with said cavities and each opening into a respectively adjacent cavity, means in each recess and normally outside the adjacent cavity for applying transverse pressure upon the belt carcass section in said cavity along its length comprising an elongated resilient tubular member in each recess, means for applying fluid under pressure to all of said tubular members to expand said tubular members toward said cavities into contact with said carcasses therein, said mold members and said resilient tubular members cooperating together to define mold cavities which are substantially completely enclosed laterally, and means for heating said mold members.

6. A device for simultaneously molding and curing sections of endless transmission belts of the rubber type having outer walls, inner walls and side walls which comprises in combination, means for maintaining said sections of the belt carcasses in tension to straighten the same and dispose them in spaced parallel relationship, a pair of mold members, said members providing a plurality of elongated straight open-ended mold cavities disposed in spaced parallel relationship and having walls corresponding to said belt walls each being adapted for the reception of a straight section of each of the belt carcasses, one mold member carrying the inner defining wall of each cavity provided with a plurality of recesses opening into a cavity adjacent the inner cavity wall, expansible means in said recesses for applying transverse pressure upon the belt carcass section in an adjacent cavity when said mold is closed, said normally expansible means being outside said adjacent cavity and expandable transversely toward said cavity into contact with a portion of the inner wall of the carcass in said cavity, said mold members and said expansible members cooperating together to define mold cavities which are substantially completely enclosed laterally, and means for heating said mold members.

7. A device for simultaneously molding and curing a plurality of sections of endless transmission belts of the rubber type having outer walls, inner walls and side walls which comprises in combination, means for maintaining said sections of the belt carcasses in tension to straighten the same and to dispose them in spaced parallel relationship, a pair of mold members, said members providing a plurality of elongated straight open-ended mold cavities disposed in spaced parallel relationship and each having walls corresponding to said belt walls adapted for the reception of said straight sections of the belt carcasses, one mold member carrying a portion of the inner defining wall of each cavity being provided with an elongated recess shorter in length than said cavity and opening into said cavity adjacent said inner cavity wall, a resilient tubular member positioned in each recess and normally outside the adjacent cavity, means for applying fluid under pressure to each of said tubular members to expand said tubular members toward said adjacent cavities and into contact with the inner wall of the belt carcasses in said cavities, said mold members and said tubular members cooperating together to define mold cavities which are substantially completely enclosed laterally, and means for heating said mold members.

ROBERT J. GORECKI.

REFERENCES CITED

The following references are of record in the file of this patent:

UNITED STATES PATENTS

| Number | Name | Date |
| --- | --- | --- |
| 2,135,763 | Nicholson | Nov. 8, 1938 |
| 2,253,792 | Leavenworth | Aug. 26, 1941 |
| 2,325,204 | Kilborn | July 27, 1943 |
| 2,327,566 | Slusher | Aug. 24, 1943 |
| 2,382,004 | Curran | Aug. 14, 1945 |

FOREIGN PATENTS

| Number | Country | Date |
| --- | --- | --- |
| 555,689 | Great Britain | Sept. 2, 1943 |